US008793261B2

(12) United States Patent
Jiang et al.

(10) Patent No.: US 8,793,261 B2
(45) Date of Patent: Jul. 29, 2014

(54) METHOD AND SYSTEM FOR GENERATING GRAMMAR RULES

(75) Inventors: Jason Jiang, Wheelers Hill (AU); Bradford Craig Starkie, Surrey Hills (AU); Bhavani Laxman Raskutti, Surrey Hills (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 546 days.

(21) Appl. No.: 10/399,587

(22) PCT Filed: Oct. 17, 2001

(86) PCT No.: PCT/AU01/01308
§ 371 (c)(1),
(2), (4) Date: Aug. 15, 2003

(87) PCT Pub. No.: WO02/33583
PCT Pub. Date: Apr. 25, 2002

(65) Prior Publication Data
US 2004/0044952 A1 Mar. 4, 2004

(30) Foreign Application Priority Data

Oct. 17, 2000 (AU) .................................. PR0824/00

(51) Int. Cl.
*G06F 17/30* (2006.01)
(52) U.S. Cl.
USPC .............................................. 707/750; 704/9
(58) Field of Classification Search
USPC ........ 707/3, 5, 6, 100, 102, 750; 704/10, 200, 704/231, 251, 9
See application file for complete search history.

(56) References Cited

U.S. PATENT DOCUMENTS

| 5,418,951 | A |   | 5/1995  | Damashek |
|-----------|---|---|---------|-----------------|
| 5,752,051 | A |   | 5/1998  | Cohen |
| 5,752,232 | A |   | 5/1998  | Basore et al. |
| 5,819,220 | A |   | 10/1998 | Sarukkai et al. |
| 6,006,221 | A | * | 12/1999 | Liddy et al. ........................ 707/5 |
| 6,026,388 | A | * | 2/2000  | Liddy et al. ........................ 707/1 |
| 6,081,774 | A | * | 6/2000  | de Hita et al. ..................... 704/9 |
| 6,101,473 | A |   | 8/2000  | Scott et al. |
| 6,185,527 | B1|   | 2/2001  | Petkovic et al. |
| 6,519,562 | B1| * | 2/2003  | Phillips et al. ................ 704/240 |

OTHER PUBLICATIONS

Kageura, Kyo, et al., *Method of Automatic Term Recognition*, Department of Computer Science, University of Sheffield, XP-002477863, BNSDOCID<XP 2477863A_1>, pp. 1-23, May 27, 1996.
Mayfield, James, et al., *Indexing Using Both N-Grams and Words*, The Johns Hopkins University Applied Physics Laboratory, XP-002477864, BNSDOCID<XP 2477864A_1>, pp. 1-5, 1999.
Unknown, *Grammar Developer's Guide*, Nuance Speech Recognition System, Version 8.0, XP-001117344, BNSDOCID<XP 001117344_1>, entire book, 1996.

* cited by examiner

*Primary Examiner* — Apu Mofiz
*Assistant Examiner* — Chelcie Daye
(74) *Attorney, Agent, or Firm* — Nixon Peabody LLP

(57) ABSTRACT

An information retrieval system including a natural language parser (3) for parsing documents of a document space (1) to identify key terms of each document based on linguistic structure, and for parsing a search query to determine the search term, a feature extractor (4) for determining an importance score for terms of the document space based on distribution of the terms in the document space, an index term generator (5) for generating index terms using the key terms identified by the parser and the extractor and having an importance score above a threshold level, and a query clarifier (16) for selecting from the index terms, on the basis of the search term, index terms for selecting a document from the document space. A speech recognition engine (12) generates the query, and a bi-gram language module (6) generates grammar rules for the speech recognition engine using the index terms.

15 Claims, 1 Drawing Sheet

METHOD AND SYSTEM FOR GENERATING GRAMMAR RULES

FIELD

The present invention relates to a system able to determine index terms to generate grammar rules, used for speech recognition.

BACKGROUND

Document retrieval systems, such as search engines, have been the subject of considerable research and development. The sophistication of speech recognition systems has also significantly advanced. One of the difficulties facing document retrieval systems is providing a process which limits or obviates the retrieval of irrelevant documents in response to a user's query. This problem however proves even more difficult if it is desired to provide a speech recognition based interface for retrieval of documents. Speech recognition systems have previously been used for limited retrieval applications involving a very structured and limited data set for information retrieval. It is desired to provide a useful alternative to existing information retrieval systems and the steps they execute.

SUMMARY

In accordance with the present invention there is provided a method of generating index terms for documents, including:
  parsing the documents to identify key terms of each document based on sentence structure;
  determining an importance score for said key terms based on a distribution of said key terms in said documents;
  retaining said key terms having an importance score above a predetermined threshold as said index terms; and
  generating grammar rules, for a speech recognition engine, using said index terms.

The present invention also provides an information retrieval method, including:
  parsing a search query to determine at least one search term;
  matching said at least one search term against index terms of documents to select index terms and determine matching documents;
  ranking said matching documents according to a fitness value of the selected index terms in each matching document;
  presenting said matching documents according to said rank; and
  generating grammar rules for a speech recognition engine using said index terms.

The present invention also provides an information retrieval system, including:
  a speech recognition engine for generating a search query;
  a natural language parser for parsing documents of a document space to identify key terms of each document based on linguistic structure, and for parsing said search query to determine at least one search term;
  a feature extractor for determining an importance score for the key terms based on a distribution of said key terms in said document space;
  an index term generator for generating index terms using said key terms identified by said parser and said extractor and having an importance score above a threshold level;
  a query clarifier for selecting from said index terms, on the basis of said at least one search term, index terms for selecting at least one document from said document space; and
  a grammar generator for generating grammar for said speech recognition engine using said index terms.

DESCRIPTION OF THE DRAWINGS

A preferred embodiment of the present invention is hereinafter described, by way of example only, with reference to the accompanying drawing, wherein.

DETAILED DESCRIPTION OF PREFERRED EMBODIMENTS OF THE INVENTION

Figure 1:
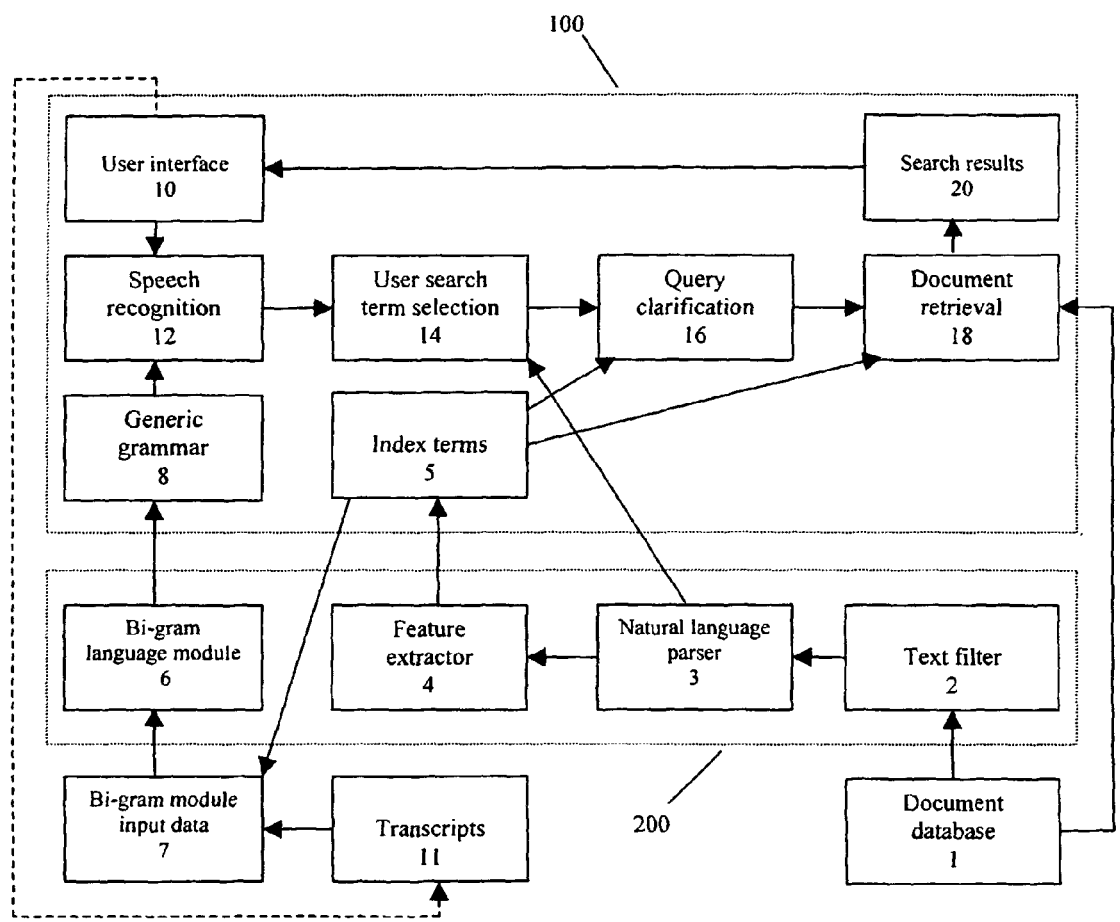
FIG. 1 is a block diagram of a preferred embodiment of an information retrieval system.

An information retrieval system, as shown in FIG. 1, includes an extraction system 200 for generating index terms from documents, and a query response system 100 for interpreting voice commands and retrieving stored documents. The query response system 100 retrieves documents from a document database 1 in response to voice commands spoken into the user interface 10 of the system 100. For example, the user could say "Tell me about the Concord crash in France", and the system 100 would recognize the speech input as one or more sentences in text form, each of which gives one interpretation of the speech input. The system analyses the content of the sentence to identify the command and the topic sought, and then locate and provide relevant documents to the user. These documents could be listed or displayed on the user interface 10, spoken by a text-to-speech engine, or presented by some other presentation method. The query response system 100 is the online part of the retrieval system, whereas the extraction system 200 constitutes the offline part of the retrieval system.

The information retrieval system includes a number of software modules 2 to 20, shown in FIG. 1, which may be stored and executed on separate or distributed computer systems or a single computer system. For example, the user interface and speech recognition modules 10 and 12 of the query response system 100 may be stored and executed on an Interactive Voice Response (IVR) unit, such as the Periphonics IVR produced by Nortel Networks. The other modules of the query response system 100 may be stored and executed on a back-end server. The extraction system 200 may store and execute its modules on a separate back-end server. The servers and the IVR may communicate over a communications network or be connected in the same physical location, and have access to the document database 1 and a transcripts database 11. The document database 1 contains all the documents that can be retrieved. The database 1 may be a single database or multiple databases of documents, and may include documents accessible on the Internet. The transcripts database 11 contains text representing the spoken phrases that have been recently input by users to the user interface 10, such as in the last a couple of days. As will be understood by those skilled in the art, at least some of the operations executed by the modules may be executed by hardware circuits, such as ASICs of the retrieval system. A number of the individual modules may also be based on or provided by modules described in the specification of International Patent Application PCT/AU00/00797 for a search system (hereinafter referred to as the "search system specification"), herein incorporated by reference.

In order for the system to support information retrieval, a series of tasks related to data preparation are initially performed. The first task is to generate index terms or domain concepts from the stored documents of the document database 1 which allow the documents to be matched to the voice input query terms. This process begins by processing the text of the documents by a natural language parser 3. However, if the documents are in some form other than plain text, such as a rich text or word processing format (e.g., HTML, XML, SGML, RTF, Microsoft Word™), they are first processed by a text filter 2 to remove all the formatting or other extraneous content prior to processing by the natural language parser 3.

Given a document, the natural language parser 3 uses the structure and linguistic patterns of English text to extract linguistically important words and phrases from the sentences in the document. These words and phrases are referred to as key linguistic terms of the document. The parser 3 first identifies those "chunks" that represent the local linguistic structures in a sentence. It then selects from each chunk the key linguistic terms that are likely to carry the key information in that sentence. For example, given the sentence "NASA wants to send an orbiting surveyor to Mars", the parser 3 identifies the following chunks: "NASA", "want to send", "an orbiting surveyor", "to Mars". From them, the parser 3 would extract the following words and phrases: "NASA", "orbiting surveyor", and "Mars".

To recognise sentence chunks, the parser utilises a data structure called a key-centred phrase structure frame, such as: NP→det adj*noun, where NP refers to a noun phrase having a determiner (det), adjective (adj) and noun.

The category preceded by an asterisk—"noun" in this example—is the key category that will match the content word in a chunk. Once a word with the category "noun" is identified in a sentence, this frame is attached to that word (the word is called an anchor word in the following discussion) and the key category in the frame is aligned with the word. Next, the frame is instantiated by using a tolerant bidirection pattern matching process. During the pattern matching process, the parser collects the words towards the two ends of the sentence whose categories match those in the frame. When no contiguous words of the same category remain, the matching process begins again with the category of the adjacent words, if any. A matched word is stored in a slot associated with the category in a frame.

The matching process also creates a four-element tuple <S, E, CL, P> for each instantiated frame, where:

S is the start position, the position of the leftmost word stored in the frame in the original sentence;

E is the end position, the position of the rightmost word stored in the frame in the original sentence;

CL is the covered length, ie the number of words stored in the frame; and

P is the preference index, which is the difference between the number of matched categories and the number of unmatched categories in the frame.

The frames are classified into different classes according to when they will be applied. For example, any frames whose right hand side (RHS) contains only terminal categories such as NP above is used in a bottom-up matching process and will be applied first. Any frames whose RHS consists of merely non-terminals will be used in a top-down analysis process and will be applied in a later stage. This frame invocation scheme allows the frame instantiation process described above to proceed in an orderly manner.

Figure 2:
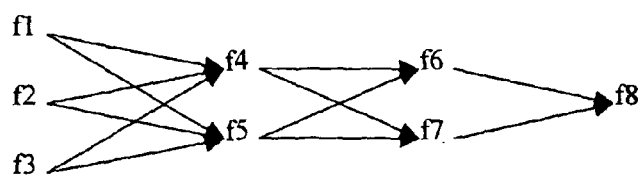
FIG. 2 is a frame relation graph generated by a natural language parser of the information retrieval system.

When all the frames have been instantiated, a frame relation graph is generated. An example of such a graph is given in FIG. 2. The frame relation graph is an acyclic, directed graph that contains four-element tuples as its nodes. These nodes are separated into three classes: start nodes such as f1, f2, f3 in FIG. 2, end nodes such as f8, and intermediate nodes such as f4, f5, f6 and f7.

In a frame relation graph, a start node, one or more intermediate nodes, and an end node form a path that represents one particular way of linking some of the frames. Two rules govern the formation of these paths: (1) only two nodes representing non-overlapped frames can appear in the same path; (2) only two nodes representing two adjacent instantiated frames can be linked by an arrow. The parser then parses again each of the paths in the graph. The parsing method used here is similar to the frame instantiation process described earlier, and combines both bottom-up and top-down methods, with the difference that the lowest units in the parsing process are now the nodes in the path (i.e. the chunks recognised so far).

After the parallel parsing process, if one path gives a complete parse, this is the final path result produced by the parser 3. If more than one path gives a complete parse, the final result is selected using the following rules. The totals of the CL values of the nodes are calculated. If the total for one path is greater than any other, then that path is chosen. If not, then the same rule is applied to the totals of the P values of the nodes in the path. If no path parses completely, the above two rules are used and the path with the lowest number of nodes is selected. If there is more than one path selected (very rare), a path will be picked up arbitrarily when no other knowledge (e.g. contextual or domain knowledge) is available to perform further comparison.

The nodes in the final path correspond to the local structures or sentence chunks that contain potentially useful key words and phrases. Two more steps are required to extract these key linguistic terms: (1) all determiners such as "a", "this", "all", "some", etc are removed, and (2) for a phrase containing more than two words, some subphrases contained in that phrase are generated. For example, from the phrase "U.S. President Bill Clinton", the parser would generate two extra phrases "President Bill Clinton" and "Bill Clinton". These key linguistic terms are then stored with the source document for further processing.

The feature extractor 4 performs two tasks: feature extraction for individual documents and the determination of word importance within a document set. The extraction system 200 uses the output produced by the parser 3 with the output generated by feature extractor 4 to build index terms 5.

The feature extraction process extracts words and phrases from a document that is most descriptive of that document. These words and phrases form the initial feature set of the document. The process is similar to that described in J. D. Cohen, "Highlights: Language and Domain Independent Automatic Indexing terms for Abstracting", Journal of the American Society for Information Science, 46(3): 162: 174, 1995 for generating highlights or abstracts of documents retrieved by an information retrieval system.

The feature extraction is based on n-grams. N-grams are sequences of characters of length n. Every document is represented as a sequence of characters or a vector of characters (referred to as document-sequence vector). Each document-sequence vector is processed to extract n-grams and their frequencies (number of occurrences) for that document. For example, the sequence of characters "to build" will give rise to the following 5-grams "to bu", "o bui", "buil", "build".

In order to determine the words and phrase that describe a document or a group of documents, the following is executed. First, the distribution of the n-grams over the document space is computed by counting the occurrence of n-grams in the documents. Each n-gram is assigned a score per document that indicates how novel or unique it is for the document. This novelty score is based on the probability of the occurrence of the n-gram in the document and the probability of occurrence elsewhere and is calculated using the following formula:

$$\Psi_{ij} = \begin{cases} (S_j * p_{ij} * \ln p_{ij}) + ((S - S_j) * q_{ij} * \ln q_{ij}) - (S * t_{ij} * \ln t_{ij}), & p_{ij} \geq q_{ij} \\ 0, & p_{ij} < q_{ij} \end{cases}$$

where $\Psi_{ij}$ is the novelty score of the n-gram i in document j, $p_{ij}$ is the probability of the occurrence of n-gram i in document j, $q_{ij}$ is the probability of occurrence of n-gram i elsewhere in the document space, $t_{ij}$ is the probability of occurrence of n-gram i in the whole document space, $S_j$ is the total count of n-grams in document j, and S is $\Sigma S_j$.

Next, the novelty score of each n-gram is apportioned across the characters in the n-gram. For example, the apportioning could be so that the entire score is allocated to the middle character, and the other characters are assigned a score of zero. This apportioning allows each character in the sequence (hence each entry in the document-sequence vector) to be assigned a weight. Finally, these weights are used to compute a score for each word or phrase based on their component characters and their scores. These scores combined, if necessary, with language-dependent analysis, such as stemming, may be used to filter out non-essential features, if desired.

Thus, the output of the feature extractor is a set of terms (words or phrases) from the document, and a score indicating how well it describes the document, i.e, how close it is to the topic of the document. This also means that the same words, e.g., vector, may have different scores: a higher score in a document about vector analysis and a lower score in a document that uses vector analysis for search engines. This score is then used during information retrieval so that the query "vector" would yield both these documents, but the document about vector analysis would be ranked higher.

Since the feature extraction process is based on n-grams, there is no necessity for language-dependent pre-processing such as stemming and removal of function words. Hence, this extraction process is language-independent. It is also tolerant of spelling and typing errors since a single error in the spelling of a long word would still yield some n-grams that are same as those from the correctly spelt word. In addition, the same feature extraction technique can be used to extract words or phrases or sentences or even paragraphs (for large documents) since the fundamental unit for determining novelty is not words but character sequences. Further, the character sequences need not even be text. Hence, with modifications, the same technique may be used to pick out novel regions within an image or audio track.

After generating a set of terms with their weights indicating how well they describe the document, a feature set of the document is created as follows:

(1) If a word or a phrase is in the document title, it is included in the feature set with an initial weight of 1.0 (the number 1.0 might be varied based on experiments for different applications);

(2) If a word or a phrase is in the set of terms generated by the feature extractor, it is included in the feature set. If the word does not appear in the document title, its weight is the weight generated by the feature extractor. If it appears in the title of the document, its weight is the total of its initial weight 1.0 and the weight generated by the feature extractor.

The feature set of a document is used in the document retrieval process.

The feature extractor 4 determines a score for each term in a particular document. In order to build grammars and to retrieve documents meaningfully, however, it is often necessary to know the overall importance of a word within the whole document set. For instance, if all the documents within a set are about Telstra, then the word "Telstra" is less important in that document set than, say, another word, such as "Mobilenet". The word importance module assigns a score to each word in the index set (determined by the index generation module) based on its importance, i.e., its ability to discriminate. This ability of a word to discriminate depends on how many documents a word appears in (referred to as DF), and the frequency of that word (referred to as TF) in each of those documents. Those words that appear frequently within a few documents are more discriminating than those that appear in most of the documents infrequently. Traditionally, in information retrieval, this reasoning is captured using the TFs and DF of each word to arrive at an importance value, as described in Salton, The SMART Retrieval System—Experiments in Automatic Document Processing, Prentice-Hall, N.J., 1971 ("Salton").

In the extraction system 200, the discrimination ability is determined based on the notion that when a word is discriminating and it is removed from the feature space, then the average similarity between documents in the repository increases. Thus, by determining average similarity between documents with and without a word, it is possible to determine its discriminating ability. The average similarity of a document set is determined by summing the similarities between each document and the centroid (where the centroid is the average of the word frequency vectors of all the documents in the set). The similarity is computed by using a cosine coefficient, as discussed in Salton. The input to the word importance analysis process is the word frequency vector for each document, and the output is a score for each word indicating its importance. This score is referred to as the importance score of the word.

The natural language parser 3 generates key linguistic terms that represent good candidates for index terms based on sentence structures. However, due to the nature of the syntactic analytic method used, the parser 3 will also select words and phrases that may be linguistically important but contribute little to search purpose, such as the term "hour" in the sentence "The cabinet meeting lasted about an hour." On the other hand, the feature extractor 4 is able to identify terms that are most descriptive of a document but these terms are in general limited to one or two words. The extraction system 200 uses the features of a document to remove those key linguistic terms of the same document that have little use for search purposes. This is achieved by removing those key linguistic terms of a document determined by the parser 3 that do not contain any terms from the set of features generated by the feature extractor 4 for that document. The remaining key linguistic terms form the set of index terms or domain concepts 5 of the document that will be used in the information retrieval process. By adding the importance scores of all the words in an index term together, the importance score of the index term can also be determined.

The index terms or domain concepts 5 thus identified are used in two ways. In addition to providing index terms for locating documents matching search terms, they are also used to generate domain-specific grammar rules 8 for the speech recognition engine 12. This is performed by a bi-gram language module 6 to produce word pair grammar rules. The rules 8 constrain the speech recognition grammar and thereby enhance the document matching performance of the system. The domain-specific grammar rules 8 augment the manually coded sentence structure grammar rules which remain relatively constant across different application domains. Live voice data transcripts 11 received during use of the interface are also processed in order to supplement the initial grammar rules and enhance their coverage.

The bi-gram language module 6 takes as its inputs a list of index terms 5 plus a list of transcripts 11 that have been manually entered. The index terms 5 represent the phrases that are likely to be spoken by the user based upon the documents that can be returned. The list of transcripts represents spoken phrases that have been input in the recent past, usually the last two or three days.

As shown earlier, each of the index terms 5 has associated with it a weight that is an estimation of the overall importance of the term within a document set. Each transcript in the list of transcripts 11 also has a weight assigned to it. The weight given to a transcript in the list of transcripts is equal to or greater than the greatest weight generated by the feature extractor, multiplied by the number of times the phrase has been observed. This will bias the probabilities in favour of those word pairs that have been observed on earlier days, over those that have not been observed. Alternatively, a phrase may occur more than once in the transcript list 11 if it has been recorded more than once, and each entry is given the same weight.

The index terms 5 and the list of transcripts 11 are added together to create a single list of phrases. This list is compiled as bi-gram module input data 7. This list is considered to be a list of noun phrases, even though it contains transcriptions that may be more than noun phrases. A bi-gram language model is then generated from this combined list by the bi-gram language module 6. A bi-gram language model is a language model that states that one word can follow another word with a specific probability. A word pair language model is a bi-gram language model where the probability of one word following another can be either 0 or 1.

Each entry in the bi-gram module input data 7 can be considered to be a sequence of words as follows:

$$X_1 X_2 \ldots X_I$$

For the purposes of the bi-gram language model, each observation is considered to also include a start symbol ($\alpha$) and an end symbol ($\Omega$):

$$\alpha X_1 X_2 \ldots X_I \Omega$$

The length of each observation may differ between observations.

A two dimensional associative array is created to count the transitions from one word to another. Advantageously this may be a sparse array such that only transitions that have been observed are stored in the array.

The entry for each symbol transition $X_a$, $X_b$ is then incremented by the weight attached to the index term. For instance if the first phrase in the phrase list (XX) was "aboriginal community of umagico" with weight=1.371258

It would create the following entries in the associative array.

| $X_a$ | $X_b$ | count |
|---|---|---|
| α | aboriginal | 1.371258 |
| aboriginal | community | 1.371258 |
| community | of | 1.371258 |
| of | umagico | 1.371258 |
| umagico | Ω | 1.371258 |

If the first phrase in the combined list was
"aboriginal community" with weight=1.089166;
the following entries would be created in the associative array

| $X_a$ | $X_b$ | count |
|---|---|---|
| α | aboriginal | 1.089166 |
| aboriginal | community | 1.089166 |
| community | Ω | 1.089166 |

If both entries occurred in the combined list the entries in the associative array would be

| $X_a$ | $X_b$ | count |
|---|---|---|
| α | aboriginal | 2.460424 |
| aboriginal | community | 2.460424 |
| community | of | 1.371258 |
| community | Ω | 1.089166 |
| of | umagico | 1.371258 |
| umagico | Ω | 1.371258 |

A user, however, may speak noun phrases that are shorter than those in the index terms 5. For instance, although the index terms 5 may contain an index term such as "the prime minister john howard", users may simply say "john howard" or "the prime minister."

Additional index terms are created that represent each word in the index term, spoken in isolation. Each one of these index terms will have the same weight as the index term it is generated from. For instance for the phrase "aboriginal community of umagico" with weight=1.371258

The following additional counts are added to the associative array.

| $X_a$ | $X_b$ | count |
|---|---|---|
| aboriginal | Ω | 1.371258 |
| community | Ω | 1.371258 |
| of | Ω | 1.371258 |
| umagico | Ω | 1.371258 |
| α | aboriginal | 1.371258 |
| α | community | 1.371258 |
| α | of | 1.371258 |
| α | umagico | 1.371258 |

If the combined list contained only the two previous entries in it, the associative array would be as shown below.

| $X_a$ | $X_b$ | count |
|---|---|---|
| α | aboriginal | 4.920848 |
| α | community | 2.460424 |

-continued

| $X_a$ | $X_b$ | count |
|---|---|---|
| α | of | 1.371258 |
| α | umagico | 1.371258 |
| aboriginal | community | 2.460424 |
| aboriginal | Ω | 2.460424 |
| community | of | 1.371258 |
| community | Ω | 3.54959 |
| of | umagico | 1.371258 |
| of | Ω | 1.371258 |
| umagico | Ω | 2.742516 |

It can be shown that this also enables sub strings of any length from the original two index terms, for instance "community of umagico" is also a valid phrase according to the bigram model.

This bi-gram language model is then created into a set of context free rules that can be combined with other predetermined context free rules. A bi-gram transition of the form $X_a X_b$ can be converted to a context free grammar rule of the form $X_a \rightarrow xb\ X_b \sim p$ A context free grammar is a set of rules, consisting of symbols. These symbols can be either words such as "community" or nonterminals that can be expanded into other symbols.

In this notation, upper case symbols represent non-terminals that need to be expanded, and lower case symbols represent words that can be spoken. A context free grammar rule thus has on the left side a nonterminal to be expanded, and a right hand side which contains a set of symbols the left hand side can be replaced with. In the notation used above, $X_a$ represents the Non-Terminal on the left hand side. The right hand side of the rule is "xb Xb". In addition, the rule has a probability p. The sum of the probabilities of all rules with the same left hand side must sum to 1.

When a bigram transition is created using the notation above, a nonterminal is assigned to each symbol. In the example above, the nonterminal Xb represents all of the symbols that can occur after the symbol xb is generated. In the general case, each nonterminal in the bigram or word pair grammar would have a unique prefix to ensure that the non-terminal symbol is unique. The non-terminals can also be considered to be states of a state machine.

For instance the rule above defines that while in the state Xa, if a xb symbol is encountered then the state machine represented by the grammar transitions to the state Xb.

The probability of each bi-gram transition is estimated by dividing the counts associated with the bi-gram transition by the sum of all counts attached to the same non-terminal. For instance, in the example above, there are two possible words that can follow the word "community". These words are "of", or the termination symbol. Therefore, assuming the terminal symbol could be represented as a space (" ") this part of the grammar expressed in Nuance™ format would be

```
NT1Community [
    (ofNT1Of) ~0.279
    () ~0.721
]
```

It can be seen that the sum of these probabilities is equal to one. The non-terminals here are prefixed with the string "NT1" to provide a unique non-terminal name.

In a number of grammar formats, empty grammar expressions are prohibited and thus the context free grammar generated at this point should have those rules containing empty right hand sides removed, without altering the phrases that can be generated, or their probabilities. This is done by considering a non-terminal with rules with empty sides on it as optional. For instance the context free grammar generated by the bi-gram associative array above would be

```
NT1NP → aboriginal NT1Aboriginal 4.920848
NT1NP → community NT1Community 2.460424
NT1NP → of NT1Of 1.371258
NT1NP → umagico NT1Umagico 1.371258
NT1Aboriginal → community NT1Community 2.460424
NT1Aboriginal → 2.460424
NT1Community → ofNT1Of 1.371258
NT1Community → 3.54959
NT1Of → umagico NT1Umagico 1.371258
NT1Of → 1.371258
NT1Umagico → 2.742516
```

Where a rule doesn't contain a right hand side, eg. NT1Community→3.54959, two copies are made of every rule that references this non-terminal, such that the non-terminal is either missing or in existence. For instance

```
NT1NP → community NT1Community
NT1NP → community
NT1Aboriginal → community NT1Community
NT1Aboriginal → community
```

Rule counts are modified so that the sum of the two counts remains the same, but the rule with the missing non-terminal has its count set to the original rule, multiplied by the probability of the empty rule, and the rule with non-terminal remaining has its count set to the original rule, multiplied by one minus the probability of the empty rule. For instance,

| | |
|---|---|
| NT1NP → community NT1Community 0.6864 | (0.279 * 2.460424) |
| NT1NP→ community 1.7740 | (0.721 * 2.460424) |
| NT1Aboriginal → community NT1Community 0.686458 | (0.279 * 2.460424) |
| NT1Aboriginal → community 1.7740 | (0.721 * 2.460424) |

The empty rule (EG "NT1Community→3.54959") is then removed. The remaining rules attached to the non terminal remain unaffected (e.g., "NT1Community→of NT1Of 1.371258"). This process continues until there are no more rules with empty right hand sides remaining. The resulting grammar is then converted into a format that can be loaded in by the speech recognition engine 12. Probabilities are calculated, and the probabilities that might otherwise be rounded down to zero are rounded up to a minimum probability. The given example in Nuance™ format would then be

```
NT1NP [
    ( aboriginal NT1 Aboriginal )~0.250501
    ( community NT1Community )~0.0621242
    ( of umagico )~0.0621242
    ( aboriginal )~0.250501
    ( community )~0.187375
    ( of )~0.0621242
    ( umagico )~0.125251
]
NT1Aboriginal [
    ( community NT1Community )~0.25
    ( community )~0.75
]
```

```
NT1Community [
  ( of umagico )~0.5
  ( of )~0.5
]
```

This context free grammar can then be used by the generic grammar 8 that uses this grammar fragment as a noun phrase in a more comprehensive context free grammar. The exact structure of this grammar depends upon the question being asked, and should be modified based upon transcripts 11 either manually or automatically. Where the user is being asked to state a news topic they are interested, eg in a news retrieval service, a suitable grammar might be (in Nuance™ format) as shown in Appendix A.

The probability of a word pair is obtained by using the phrases in the transcripts and/or the generated index terms. A similar technique can be implemented if no transcripts 11 are available. In this scenario, the bi-gram grammar is built from the index terms 5 alone. It may be advantageous in this scenario not to use the calculated rule probabilities, but instead to set them to be either 0 or 1. The reason for this is that the rule probabilities are calculated using the output texts, rather than examples of phrases that are actually being spoken by users. There is, however, likely to be some correlation between the distribution of word pairs in the output text and the input phrases due to the fact that both represent examples of some small subset of spoken language related to the topic contained in the described text. When the bigram probabilities are generated from both the generated index terms and the transcripts of voice input, this biases the probabilities in favour of those word pairs already observed. In addition, the probabilities also bias the recognised phrases in favour of the more commonly occurring terms in the index terms 5 or in the transcripts 11. The decision of whether to use probabilities or not in the grammar presented to the speech recognition engine depends on the particular application, as is the weighting of counts of transcripts versus generated index terms.

The above tasks, including parsing, feature extraction, word importance determination, and bi-gram language module generation, are all executed by the 'offline' extraction system 200 which is applied to stored documents of the database 1 prior to retrieval. To retrieve stored documents, a user issues a spoken voice command to a microphone of the retrieval system user interface 10 in order to locate documents based on some search criteria. The user interface 10 may be a standard telephone handset that is connected by a telecommunications network to an IVR that includes the speech recognition engine 12. Alternatively, the user interface 10 may include pages of a web site served to a user that includes code able to capture sound data generated using a microphone connected to the sound card of the user's computer system, which is connected to the Internet and has received the code of the site. The speech recognition engine 12 interprets the incoming sound data as a series of words and generates a set of n-best interpretations of the query, each having a confidence score. This may be performed using a commercially available speech engine such as Nuance™ 7.0 by Nuance Communications, Inc. (http://www.nuance.com).

Many speech recognition engines such as Nuance™ allow the output of n-best interpretations of the spoken user query with some confidence scores. For example, given the voice input "is there any water in Mars", the speech recognition engine 12 might return several top interpretations with their confidence scores as follows:

| | |
|---|---|
| "is there any water mars" | 51 |
| "is there water in march" | 48 |
| "is there any water in mars" | 45 |
| "is there water march" | 45 |

To derive useful search terms from the set of interpretations, the following steps are executed: (1) each of the interpretations is parsed by a user term selector 14, using an instance of the natural language parser 3, to determine potentially useful search terms; (2) these search terms are ranked by combining the parsing results and the confidence scores; (3) the final set of search terms is selected according to rank.

For the above example, the parser 3 would return the following search terms that are potentially useful for each of the four interpretations:

| | | |
|---|---|---|
| "is there any water mars" | → | "water mars" (noun-noun phrase) |
| "is there water in march" | → | "water" (noun), "march" (noun) |
| "is there any water in mars" | → | "water" (noun), "mars" (noun) |
| "is there water march" | → | "water march" (noun-noun phrase) |

The user search term selector 14 integrates the speech recognition confidence scores and natural language analysis results to select the final set of search terms to be used for document retrieval. The following steps are executed:
 (1) The highest and lowest confidence scores are determined, which are 51 and 45 in the example;
 (2) High and low thresholds are determined using the following
   high threshold=C1*highest confidence score*number of interpretations
   low threshold=C1*lowest confidence score*number of interpretations
   The factor C1 is determined by experiment. In the selector 14, it is 0.5. For the example, the two values are 102 and 90, respectively;
 (3) The total confidence score is determined for each of the words in the search terms and the words sorted according to their scores, from the highest to the lowest. The total confidence score of a word is the total of the scores of the interpretations in which the word appears with the same part-of-speech assigned by the parser 3. For example, since the word "water" appears in all four interpretations and in all the interpretations it is assigned the part-of-speech "noun" by the parser 3, its total score is 51+48+45+45=189. If, however, the word "water" were assigned a different part-of-speech, say "verb" in the second interpretation, the word would have two total confidence scores, one as a noun whose score would be 51+45+45=141, and the other as a verb whose score would be 48. For the given example, the following is produced
   "water" (noun)–189, "mars" (noun)–96, "march" (noun)–93
   Since these words are already in order, they do not need to be sorted. This list is referred to as the initial search word list;
 (4) A determination is made on which of the above words in the initial search word list should be further selected. The process involves the generation of three word lists:
  1) The first list contains all the words satisfying the following conditions:
   i) The word is in the interpretation(s) with the highest confidence score;
   ii) The word having highest total confidence score.
   This process se2lects the word "water" (noun). If no such word exists, the word(s) with the highest total confidence score are selected;

2) A second list is generated containing all the words that are in the interpretation(s) with the highest confidence score. In the example, they are "water" (noun), "mars" (noun);
3) A third list is generated using the following method:
i) select all the words with the highest total confidence score;
ii) for the rest of the words in the search term, select a word if it satisfies one of the following conditions:
   a. its score is not less than the high threshold calculated earlier;
   b. it appears in the interpretation(s) with the highest confidence score and its score is not less than a certain portion of the low threshold (in the example, it is 0.8);
For the example, this method selects "water" (noun), "mars" (noun) again.
(5) The total number of occurrences of each word in the above three lists is determined, and used to rank the words in the lists. For the example,
"water" (noun)-3, "mars" (noun)-2
This is referred to as the final search word list. The list of potential search terms identified by the parser 3 earlier is examined, and any phrases located that contain only the words in the final selection list with the same part-of-speech. For each of such phrases, a weight is assigned, which is the weight of the word in that phrase that has the lowest weight in the final selection list, comparing with all the weights of the other words in the same phrase. In the example, the phrase identified is "water mars" (noun-noun phrase)-2.
(6) All the words and phrases obtained from the above steps (5) and (6) are collected. They form the final set of the search terms. In the example, they are
"water" (noun)-3, "mars" (noun)-2, "water mars"-2
For each final search term, the number is referred to as the fitness value of that search term in the following discussion. Below, search term refers to a search term in the final set of the search terms.

The search terms identified can now be used to select the appropriate index terms. This is the task of Query Clarification module 16. The process involves the use of Longest Common Substring (LCS), a method for measuring the similarity between two strings, as discussed in Hunt & Szymanski, "A fast algorithm for computing longest common substring", *Communication of ACM,* 20, 5, 350-353, 1977. The process also generates various weights for document retrieval.

The LCS can be defined as follows. Let both $U=u_1, u_2, \ldots, u_n$, $V=v_1, v_2, \ldots, v_m$, be strings of text. If $U'=u_{i_1}, u_{i_2}, \ldots, u_{i_n}$, where $1 \le i_1, \le i_2, \ldots, \le i_n \le n$, then U' is called a substring of U. If U' is also a substring of V, then U' is a common substring of U and V. The LCS of U and V is a common substring of U and V with the greatest length among all common substrings of U and V.

As an example, given two strings A=abcbdda, B=badbabad, the LCS of A and B is abbd.

Given a search term, the following process is executed by the clarification module 16 to select the index terms relevant to that search term:
(i) For each of the words in the search term, collect all the index terms that contain that word. If no index term has been collected, the matching is unsuccessful, and the user is informed accordingly;
(ii) Determine the LCS between the search term and all the index terms collected in step (i). For each of the LCS determined, record its length (i.e. the number of words it contains), and the total of the word importance scores of the words in the LCS, which is referred to as the relevant fitness value of the index term for that particular search term.
(iii) Treat the search term and each of the index terms collected in step 2 as a pair, and determine the total fitness value between the search term and the index term using the following:
Total fitness value between a search term and a relevant index term=(the fitness value of the search term)* (the relevant fitness value of the index term for that search term)

With the above method executed by the clarification module 16, for each of the search terms, a list of relevant index terms is obtained, and a list of the total fitness values between the search term and each of its relevant index terms is also obtained. Combining the list of index terms related to each search term creates a list of index terms for all the search terms. If the size of this list is less than a manageability threshold, then the index terms in this list are used for retrieval. If, on the other hand, the number of index terms in the list exceeds the threshold, the following method is further applied to reduce them:
(i) Combine the total fitness value lists of all the search terms together to create a list of the total fitness value for all the search terms;
(ii) Determine the absolute fitness value of each index term in the final index term list mentioned above using the following method: if an index term contains the word(s) from only one particular search term, its absolute fitness value is the total fitness value between the search term and the index term; if an index term contains the word(s) in more than one search term, generate one total fitness value with each of the search terms, and set its absolute fitness value to the total of these total fitness values.
(iii) Select only the index terms whose absolute fitness values satisfy a predetermined criterion, for example, with the highest absolute fitness value, or above a predetermined threshold.

With the set of index terms selected, they are used to retrieve relevant documents. This is performed by the Document Retrieval module 18, which executes the following steps:
(i) Decide the total fitness value of the document. The total fitness value of a document is the total of the weights of the terms that appear in both the document's feature set and at least one index term in the index term set. Multiple appearances of a particular term in the index terms will result in the weight of that term to be counted multiple times in the total fitness value of the document;
(ii) Select only the documents whose total fitness values satisfy a predetermined criterion, for example, with the highest total fitness value, or above a certain threshold.

Once the most relevant documents have been identified as search results 20, they are presented to the user in an appropriate form using the interface 10. For example, the user may be presented with a list of documents to choose from, and individual documents may be displayed or played with a text-to-speech engine.

The information retrieval system as herein described has several advantages over conventional speech recognition systems, particularly its capability of automatically generating domain-dependent grammar rules and index terms. The system supports adaptive voice information retrieval services capable of working on different application domains. The system also enables automatic service creation and updating, and is therefore suitable for applications with dynamically changing content or topics, for example, a daily news service and voice access to emails.

Many modifications will be apparent to those skilled in the art without departing from the scope of the present invention as herein described with reference to the accompanying drawings.

Appendix A

```
.WaitAskTopic [
   CommonInfoCmds
   QUERY (<operation products>)
]

QUERY (?PRES [TOPIC SDECL YESNO WHQUEST SIMPERA] ?AFTERS)

PRES [um well]
AFTERS [um]

; -------------- Declarative sentences --------------------

;SDECL
SDECL [SDECL_1_a SDECL_2]

SDECL_1_a [
   (i want news [on about] TOPIC)
   (i'm [after (interested in) news] [on about] TOPIC)
   (i'm [after (interested in)] TOPIC)
   (SDECLH_U1_a (to [have get] ?[some more] information about) TOPIC)
   (SDECLH_U1_a (to [(find out about) (know ?more about)]) TOPIC)
]

;SDECLH_U1_a - used by the user to express his/her needs; can be
followed by
;    both VP and TOPIC
SDECLH_U1_a [
   (i [want need])
   (i would like)
   (i'd like)
   (id like)
]

;SDECL_2
SDECL_2 [
   ([news information] [on about] TOPIC)
]

; -------------- Yes/No-Question sentences --------------------

;YESNO
YESNO [YESNO_1]

YESNO_1 [
   ([(can you) (could you)] ?please (tell me ?something) ?about TOPIC)
]

; -------------- WH-Question sentences --------------------

;WHQUEST
WHQUEST [WHQUEST_1_a]
```

```
WHQUEST_1_a [
   (what's happening [about on] TOPIC)
]

; ---------------- Imperative sentences ----------------

SIMPERA [
   (?please tell me [something (?[the some] news) (?some information)]
?about TOPIC)
   (?please tell me ?about TOPIC)
   (tell me [something (?[the some] news) (?some information)] ?about
TOPIC ?please)
   (tell me ?about TOPIC ?please)
]

TOPIC [
   (?the NP)
   (?the NP NP)
   (?the NP and NP)
   (?the NP in NP)
]

; ----- NP (this is where we insert automatic generated grammar) ---
---
```

The invention claimed is:

1. An information retrieval method for use with documents, including:

parsing a plurality of documents stored in a digital document database on computer-accessible storage media to identify key terms of each document based on sentence structure;

extracting a plurality of n-grams from each document, wherein one or more of the n-grams include spaces and partial words;

extracting a frequency of each n-gram in each document;

extracting a frequency of each n-gram in the plurality of documents;

assigning a novelty score to each of the n-grams in each corresponding document, said novelty score representing and being based on the extracted frequency of the n-gram in the document and the extracted frequency of the n-gram in the plurality of documents;

determining which of the extracted n-grams are in each identified key term;

assigning a weight to each key term based the novelty scores assigned to at the extracted n-grams in the key term;

generating the domain-specific grammar rules for a speech recognition engine, said grammar rules including said key terms in association with respective probabilities based on the weights of the key terms, wherein the key terms define phrases that are likely to be spoken from the plurality of documents, and the grammar rules define which of the phrases are likely to follow others of the phrases with the likelihoods defined by the probabilities;

determining an importance score for each said key terms in each document based on how many of the documents include the key term and the frequency of the key term in the document;

parsing a search query to determine at least one search term wherein said search query is spoken and converted into text data representing the at least one search term by said speech recognition engine;

matching said at least one search term against the key terms of the documents to select a subset of the key terms and determine matching documents corresponding to the subset of the key terms;

generating a document fitness value for each matching document based on a subset of the importance scores corresponding to the subset of the key terms;

ranking said matching documents according to their fitness values; and presenting said matching documents according to said ranking.

2. An information retrieval method as claimed in claim 1, wherein said matching includes selecting one of said key terms that include said search term, and said generating the document fitness value includes generating a relevant fitness value for each selected key term on the basis of respective importance scores of words in a longest-common substring of the search term and the selected key term.

3. An information retrieval method as claimed in claim 2, wherein said matching includes using the selected key terms having a predetermined characteristic to determine said matching documents.

4. An information retrieval method as claimed in claim 3, wherein said predetermined characteristic is having said relevant fitness value above a predetermined threshold.

5. A method as claimed in claim 1, wherein said parsing is executed by a natural language parser.

6. A machine-readable medium having stored thereon instructions for information retrieval comprising machine-executable code which when executed by at least one machine, causes the machine to:

parse a plurality of documents stored in a digital document database on a computer-accessible storage media to identify key terms of each document based on sentence structure;

extract a plurality of n-grams from each document, wherein one or more of the n-grams include spaces and partial words;

extract a frequency of each n-gram in each document;

extract a frequency of each n-gram in the plurality of documents;

assign a novelty score each of the n-grams in each corresponding document, said novelty score representing and being based on the extracted frequency of the n-gram in the document and the extracted frequency of the n-gram in the plurality of documents;

determine which of the extracted n-grams are in each identified key term;

assign a weight to each key term based the novelty scores assigned to at the extracted n-grams in the key term;

generate the domain-specific grammar rules for a speech recognition engine, said grammar rules including said key terms in association with respective probabilities based on the weights of the key terms, wherein the key terms define phrases that are likely to be spoken from the plurality of documents, and the grammar rules define which of the phrases are likely to follow others of the phrases with the likelihoods defined by the probabilities;

determine an importance score for each said key term in each document based on how many of the documents include the key term and the frequency of the key term in the document;

parse a search query to determine at least one search term wherein said search query is spoken and converted into text data representing the at least one search term by said speech recognition engine;

match said at least one search term against the key terms of the documents to select a subset of the key terms and determine matching documents corresponding to the subset of the key terms;

generate a document fitness value for each matching document based on a subset of the importance scores corresponding to the subset of the key terms;

rank said matching documents according to their fitness values; and present said matching documents according to said ranking.

7. An information retrieval system, comprising:

an extraction system including a computer system having data processing logic configured to provide:

a parser for parsing a plurality of documents stored in a digital document database on computer-accessible storage media to identify key terms of each document based on sentence structure;

a feature extractor for:

extracting a plurality of n-grams from each document, wherein one or more of the n-grams include spaces and partial words;

extracting a frequency of each n-gram in each document;

extracting a frequency of each n-gram in the plurality of documents;

assigning a novelty score to each of the n-grams in corresponding documents, said novelty score representing and being based on the extracted frequency of the n-gram in the document and the extracted frequency of the n-gram in the plurality of documents, determining which of the extracted n-grams are in each identified key term, and assigning a weight to each key term based on the novelty scores assigned to the extracted n-grams in the key term; and a grammar generator for generating domain-specific grammar rules for a speech recognition engine, said grammar rules including said key terms in association with respective probabilities based on the weights of the key terms; and a computer system having data processing logic configured to provide:

the speech recognition engine for generating a digital search query based on the grammar rules;

a natural language parser for parsing said digital search query to determine at least one search term;

a feature extractor for determining an importance score for each said key terms in each document based on how many of the documents include the key term and the frequency of the key term in the document;

a query clarifier for selecting from said key terms, on the basis of said at least one search term, a subset of the key terms for selecting at least one document corresponding to at least one of the subset of key terms from said document database; and a document retrieval module for generating a document fitness value for each selected document based on a subset of the importance scores corresponding to the subset of the key terms, and for ranking said selected documents according to their fitness values; and an interface for presenting said selected documents according to said ranking.

8. A method of generating index terms for documents, the method comprising:

using a computer system having data processing logic configured to parse documents stored in a digital document database on a computer-accessible storage media to identify key terms of each document based on sentence structure;

using a feature extractor of the computer system to determine an importance score for said key terms based on a distribution of language independent n-grams over said documents and to assign a novelty score to each n-gram of each document based on the probability of the occurrence of the n-gram in the document and the probability of occurrence elsewhere in said documents;

retaining said key terms having an importance score above a predetermined threshold as said index terms; and generating grammar rules, for a speech recognition engine, using said index terms.

wherein the novelty score is determined on the basis of $$\Psi_{ij} = \{(S_j^* p_{ij}^* \ln p_{ij}) + ((S - S_j)^* q_{ij}^*) - (S^* t_{ij}^* \ln t_{ij}), \; p_{ij} \geq q_{ij}\} \quad P_{ij} \geq q_{ij}$$
$$0, \; P_{ij} < q_{ij}$$

where $\Psi_{ij}$ is the novelty score of the n-gram i in the document j, $p_{ij}$ is the probability of the occurrence of the n-gram i in the document j, $q_{ij}$ is the probability of occurrence of the n-gram i elsewhere in said documents, $t_{ij}$ is the probability of occurrence of the n-gram i in said documents, $S_j$ is the total count of n-grams in the document j, and S is $\Sigma\, S_j$.

9. A method as claimed in claim 1, wherein each novelty score is determined on the basis of:

$p_{ij}$, which is the probability of the occurrence of n-gram i in document j determined from the extracted frequency of the n-gram i in the document j;

$q_{ij}$, which is the probability of occurrence of the n-gram i elsewhere in said documents determined from the extracted frequency of the n-gram i in the plurality of documents and the extracted frequency of the n-gram i in the document j;

$t_{ij}$, which is the probability of occurrence of the n-gram i in said documents determined from the extracted frequency of the n-gram i in the plurality of documents;

$S_j$, which is the total count of n-grams in the document j; and

S, which is $\Sigma\, S_j$, if $p_{ij} \geq q_{ij}$.

10. A method as claimed in claim 9, wherein each novelty score is determined to be zero if $p_{ij < qij}$.

11. A method as claimed in claim 10, wherein each novelty score is determined on the basis of the following:

$$\Psi_{ij} = \{(S_j^* p_{ij}^* \ln p_{ij}) + ((S - S_j)^* q_{ij}^*) - (S^* t_{ij}^* \ln t_{ij}), \; p_{ij} \geq q_{ij}\} \quad P_{ij} \geq q_{ij}$$
$$0, \; P_{ij} < q_{ij}$$

where $\Psi_{ij}$ is the novelty score of the n-gram i in the document j.

12. A method as claimed in claim 1, wherein the plurality of n-grams extracted from each document are of the same length n.

13. A method as claimed in claim 1, wherein a natural language parser executes said parsing, and said key terms are linguistically important terms of each document.

14. A method as claimed in claim 13, wherein said parser generates key-centered phrase structure frames for sentences of each document, and generates at least one frame relation graph that is parsed to determine the frames representative of the sentences of each document, said frames including said key terms.

15. A method as claimed in claim 1, wherein generating the grammar rules comprises generating a list of phrases including said key terms and said respective weights, and inputting said list as a bi-gram array with said weights representing said probabilities, to generate said grammar rules for said speech recognition engine.

* * * * *